United States Patent
Keeney et al.

(10) Patent No.: US 9,481,213 B2
(45) Date of Patent: Nov. 1, 2016

(54) TIRE INFLATION SYSTEM HAVING A SEAL

(71) Applicant: ArvinMeritor Technology, LLC, Troy, MI (US)

(72) Inventors: Christopher Keeney, Troy, MI (US); Nicholas S. Lakin, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 196 days.

(21) Appl. No.: 14/312,804

(22) Filed: Jun. 24, 2014

(65) Prior Publication Data

US 2015/0367690 A1 Dec. 24, 2015

(51) Int. Cl.
  B60C 23/00 (2006.01)
  B60C 19/00 (2006.01)
  F16J 15/32 (2016.01)

(52) U.S. Cl.
  CPC ............ B60C 23/003 (2013.01); B60C 19/00 (2013.01); F16J 15/3268 (2013.01)

(58) Field of Classification Search
  CPC .. B60C 23/001; B60C 23/003; F16J 15/164; F16J 15/3204; F16J 15/3228; F16J 15/3232; F16J 15/3236; F16J 15/3268; F16J 15/3284
  See application file for complete search history.

(56) References Cited

U.S. PATENT DOCUMENTS

| | | | | |
|---|---|---|---|---|
| 4,298,206 | A | | 11/1981 | Kojima |
| 4,428,630 | A | * | 1/1984 | Folger .................. F16C 19/386 277/552 |
| 5,174,839 | A | * | 12/1992 | Schultz ................ B60C 23/003 152/415 |
| 5,503,480 | A | * | 4/1996 | Caillaut ............... B60C 23/003 152/417 |
| 5,642,946 | A | * | 7/1997 | Caillault .............. B60C 23/003 384/477 |
| 6,409,177 | B1 | * | 6/2002 | Johnston ............. F16J 15/3228 277/551 |
| 6,976,789 | B2 | * | 12/2005 | Pilone .................. B60C 23/003 152/417 |
| 6,994,136 | B2 | | 2/2006 | Stanczak |
| 7,086,784 | B2 | * | 8/2006 | Ruetter ................ B60C 23/003 152/417 |
| 7,625,127 | B2 | * | 12/2009 | Foti ...................... B60C 23/003 152/417 |
| 7,931,061 | B2 | * | 4/2011 | Gonska ................ B60C 23/003 152/417 |
| 7,997,316 | B2 | * | 8/2011 | Walter ................. B60C 23/003 152/417 |
| 9,162,539 | B2 | * | 10/2015 | Hibbler ................ B60C 23/003 |
| 2012/0186714 | A1 | | 7/2012 | Richardson |
| 2012/0234447 | A1 | | 9/2012 | Narloch et al. |
| 2014/0062031 | A1 | * | 3/2014 | Honzek ................ B60C 23/003 277/551 |
| 2015/0290986 | A1 | * | 10/2015 | Tsiberidis ............ B60C 23/003 152/417 |

FOREIGN PATENT DOCUMENTS

EP 1564454 A1 8/2005

OTHER PUBLICATIONS

Meritor, an ArvinMeritor brand, Mentor Tire Inflation System (MTIS) by PSI Trademark including Mentor ThermALERT Trademark, PB-9999, Revised May 2007.
European Patent Office, Extended Search Report for the corresponding European Patent Application No. EP 15164334.3 dated Dec. 12, 2015.

* cited by examiner

*Primary Examiner* — Katy M Ebner
(74) *Attorney, Agent, or Firm* — Brooks Kushman P.C.

(57) ABSTRACT

A tire inflation system that includes a seal. The seal may have an annular mounting portion and an annular lip portion. The annular lip portion may have a sealing side and a non-sealing side. Leakage of pressurized gas may be inhibited when the sealing side faces away from the annular mounting portion. Leakage of pressurized gas may be enabled when the annular lip portion is rolled such that at least a portion of the sealing side faces toward the annular mounting portion.

20 Claims, 4 Drawing Sheets

TIRE INFLATION SYSTEM HAVING A SEAL

TECHNICAL FIELD

This patent application relates to a tire inflation system that may have a seal.

BACKGROUND

A tire inflation system with an integral wheel seal is disclosed in U.S. Pat. No. 7,931,061.

SUMMARY

In at least one embodiment, a tire inflation system is provided. The tire inflation system may include a pressurized gas source and a first seal. The pressurized gas source may provide a pressurized gas for inflating a tire. The first seal may at least partially define a connection passage that may fluidly connect the pressurized gas source to the tire. The first seal may have an annular mounting portion and an annular lip portion that may extend from the annular mounting portion. The annular lip portion may have a sealing side and a non-sealing side disposed opposite the sealing side. The first seal may inhibit leakage of the pressurized gas when the sealing side faces away from the annular mounting portion. The first seal may enable leakage of the pressurized gas when the annular lip portion is rolled such that at least a portion of the sealing side faces toward the annular mounting portion.

In at least one embodiment, a tire inflation system is provided. The tire inflation system may include a spindle, a hub, and a first seal. The spindle may at least partially define a spindle passage for routing a pressurized gas. The hub may be disposed proximate the spindle may at least partially define a hub passage for routing the pressurized gas. The first seal may be disposed between the spindle and the hub and may be configured to at least partially define a connection passage that fluidly connects the spindle passage and the hub passage. The first seal may have an annular mounting portion and an annular lip portion. The annular mounting portion may extend around the spindle and may be disposed proximate the hub. The annular lip portion may extend from the annular mounting portion and may have a sealing side and a non-sealing side disposed opposite the sealing side. Leakage of pressurized gas between the first seal and the spindle may be inhibited when the sealing side engages the spindle. Leakage of pressurized gas between the first seal and the spindle may be enabled when the annular lip portion is rolled such that at least a portion of the sealing side faces toward the spindle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
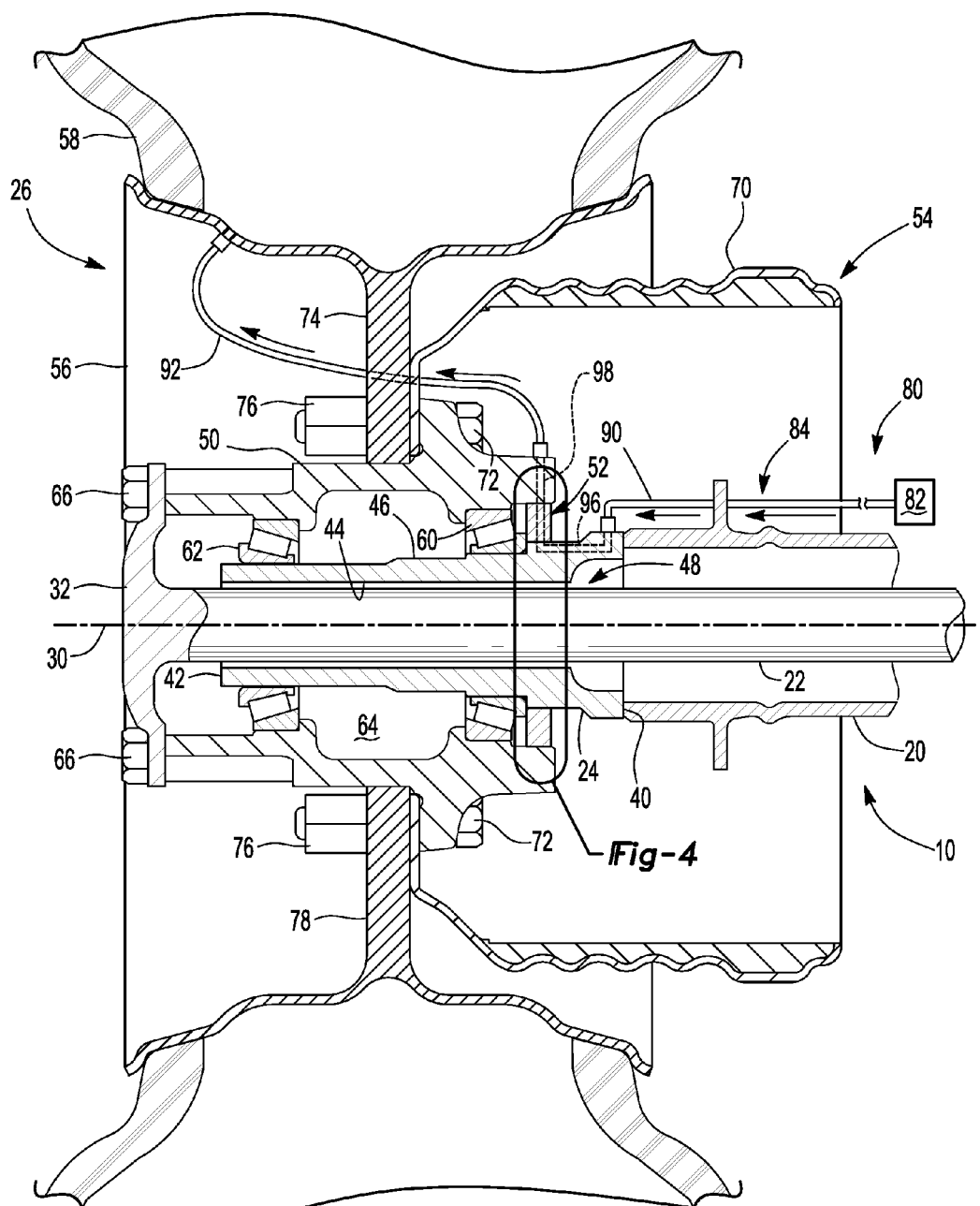
FIG. 1 is a section view of an exemplary wheel end assembly having a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels, or a trailer that may be provided with a motor vehicle.

The axle assembly 10 may facilitate mounting of one or more wheels to the vehicle and may or may not be steerable. The axle assembly 10 may be configured as a drive axle or a non-drive axle. In a drive axle configuration, the axle assembly 10 may receive torque from a power source, such as an internal combustion engine or an electric motor that may be used to propel the vehicle. In a non-drive axle configuration, the axle assembly 10 may not receive torque from a power source. In FIG. 1, the axle assembly 10 is shown with a drive axle configuration that may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, which may facilitate relative movement between the first end and the wheel end assembly 26. The axle shaft 22 may include an axle flange 32 disposed at an end of the axle shaft 22. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first spindle end surface 40, a second spindle end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20.

The first spindle end surface 40 may be disposed proximate or may engage the axle housing 20. Alternatively, the first spindle end surface 40 may be omitted in a configuration in which the spindle 24 is integrally formed with the axle housing 20 or is not provided as a separate component.

The second spindle end surface 42 may be disposed opposite the first spindle end surface 40. The second spindle end surface 42 may be located near the axle flange 32.

The internal surface 44 may extend between the first spindle end surface 40 and the second spindle end surface 42 and may at least partially define the hole 48 through which the axle shaft 22 may extend. As such, the spindle 24 may be spaced apart from the axle shaft 22 to permit the axle shaft 22 to rotate about the axis 30. In at least one embodiment, the hole 48 may receive a conduit, such as a hose, tubing or the like that may route pressurized gas for inflating a tire.

The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably disposed on the spindle 24. In a drive axle configuration, the wheel end assembly 26 may be coupled to the axle shaft 22. In at least one embodiment, the wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second spindle end surface 42 than the second wheel bearing 62. As such, the hub 50 may be configured to rotate about the axis 30 with respect to the spindle 24. In a drive axle configuration, the axle flange 32 may be coupled to the hub 50 with one or more fasteners 66 such as bolts. As such, the hub 50 may rotate with the axle shaft 22. In a non-drive axle configuration, the hub 50 may not be coupled to an axle shaft 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24. Alternatively, the wheel end seal assembly 52 may be fixedly disposed with respect to the spindle 24 and the hub 50 may rotate about the axis 30 and with respect to the wheel end seal assembly 52. Various configurations of the wheel end seal assembly 52 will be discussed in more detail below.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56, which may also be called a wheel rim, may be configured to support and facilitate mounting of an associated tire 58. The tire 58 may be a pneumatic tire that may be inflated with a pressurized gas or pressurized gas mixture. The wheel 56 may be fixedly positioned with respect to the hub 50. For example, the wheel 56 may have a wheel mounting flange 74 that may have a set of holes that may each receive a fastener 72 that may help mount on the wheel 56 to the hub 50. A lug nut 76 may be threaded onto each fastener 72 to secure the wheel 56 to the hub 50. The lug nut 76 may engage or may be disposed proximate an outboard side 78 of the wheel mounting flange 74 that may face away from the brake drum 70 or toward the axle flange 32.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture in this application. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits, such as a hose, tubing, pipe, or combinations thereof. In addition, one or more valves may be associated with or provided with a conduit to enable or disable the flow of the pressurized gas from the pressurized gas source 82 to one or more tires 58. In FIG. 1, the gas supply subsystem 84 includes a first conduit 90 and a second conduit 92. The first conduit 90 may supply pressurized gas from the pressurized gas source 82 to the axle assembly 10 or may fluidly connect the pressurized gas source 82 to the axle assembly 10. The second conduit 92 may supply pressurized gas from the axle assembly 10 to a tire 58 or may fluidly connect the pressurized gas source 82 to the tire 58. The routing of the conduits between the pressurized gas source 82 and a tire 58 is exemplary and is not meant to be limiting as other conduit routing paths may be provided. For instance, pressurized gas may be routed through a passage in the hub 50 or through a hollow fastener that may extend through the hub 50. The flow of pressurized gas is represented by the arrows near the conduits in FIG. 1.

The gas supply subsystem 84 may be provided in various configurations. In the embodiment shown in FIG. 1, the gas supply subsystem 84 routes pressurized gas from the pressurized gas source 82 through a spindle passage 96 and a hub passage 98.

The spindle passage 96 may be provided in or at least partially defined by the spindle 24. For instance, the spindle passage 96 may be a hole that may be completely defined in the spindle 24 or may be partially defined by the spindle 24 and another component, such as a sleeve that may extend around a portion of the spindle 24 and which may be at least partially spaced apart from the spindle to form the spindle passage 96. The spindle passage 96 may or may not extend to the hole 48 in the spindle 24. For instance, the spindle passage 96 may be spaced apart from the hole 48 as shown or alternatively may extend to the hole 48. As another option, the spindle passage 96 may be provided in another component that may be disposed between the spindle 24 and the hub 50. A conduit, such as the first conduit 90, may be fluidly connected to an inlet of the spindle passage 96.

The hub passage 98 may be provided in or may be at least partially defined by the hub 50. For instance, the hub passage 98 may be completely defined in the hub 50 or may be partially defined by the spindle 24 and another component. A conduit, such as the second conduit 92, may be fluidly connected to an outlet of the hub passage 98.

Figure 2:
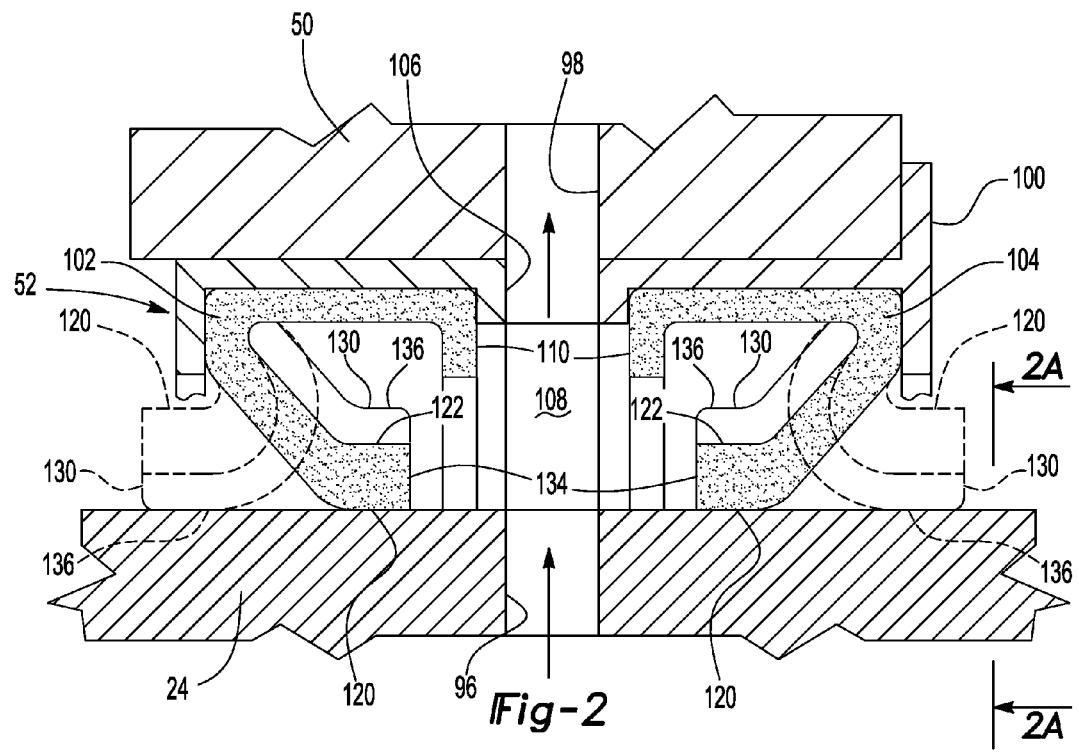
FIG. 2 is a section view of an embodiment of a wheel end seal assembly.

Referring to FIG. 2, an example of a wheel end seal assembly 52 is shown. The wheel end seal assembly 52 may be configured to fluidly connect the first conduit 90 to the second conduit 92. For example, the wheel end seal assembly 52 may fluidly connect the spindle passage 96 to the hub passage 98 and the second conduit 92.

Referring to FIG. 2, a first embodiment of a wheel end seal assembly 52 is shown that may include a mounting ring 100, a first seal 102, and a second seal 104.

The mounting ring 100 may facilitate mounting of the first seal 102 and/or the second seal 104. For example, the first seal 102 and the second seal 104 may be disposed proximate and may be fixedly mounted to the mounting ring 100. Alternatively, the first seal 102 and the second seal 104 may be mounted on separate mounting rings in one or more embodiments. The mounting ring 100 may include an opening 106 that may allow pressurized gas to pass through the mounting ring 100 and enter the hub passage 98. The opening 106 may be disposed between the first seal 102 and the second seal 104 in one or more embodiments. In at least one embodiment, the mounting ring 100 may be mounted to or fixedly positioned with respect to the hub 50. As such, the mounting ring 100, first seal 102, and second seal 104 may rotate with the hub 50 about the axis 30 and with respect to the spindle 24.

The first seal 102 and the second seal 104 may be at least partially spaced apart from each other. The first seal 102 and the second seal 104 may cooperate to at least partially define a connection passage 108 that may fluidly connect the pressurized gas source 82 to the tire 58. The connection passage 108 may be disposed between the first seal 102 and the second seal 104. The connection passage 108 may receive pressurized gas from the outlet of the spindle passage 96 and may route or provide pressurized gas to an inlet of the hub passage 98. The first seal 102 may be disposed between the second seal 104 and the second spindle end surface 42 and/or first wheel bearing 60 from the perspective shown.

Figure 3:
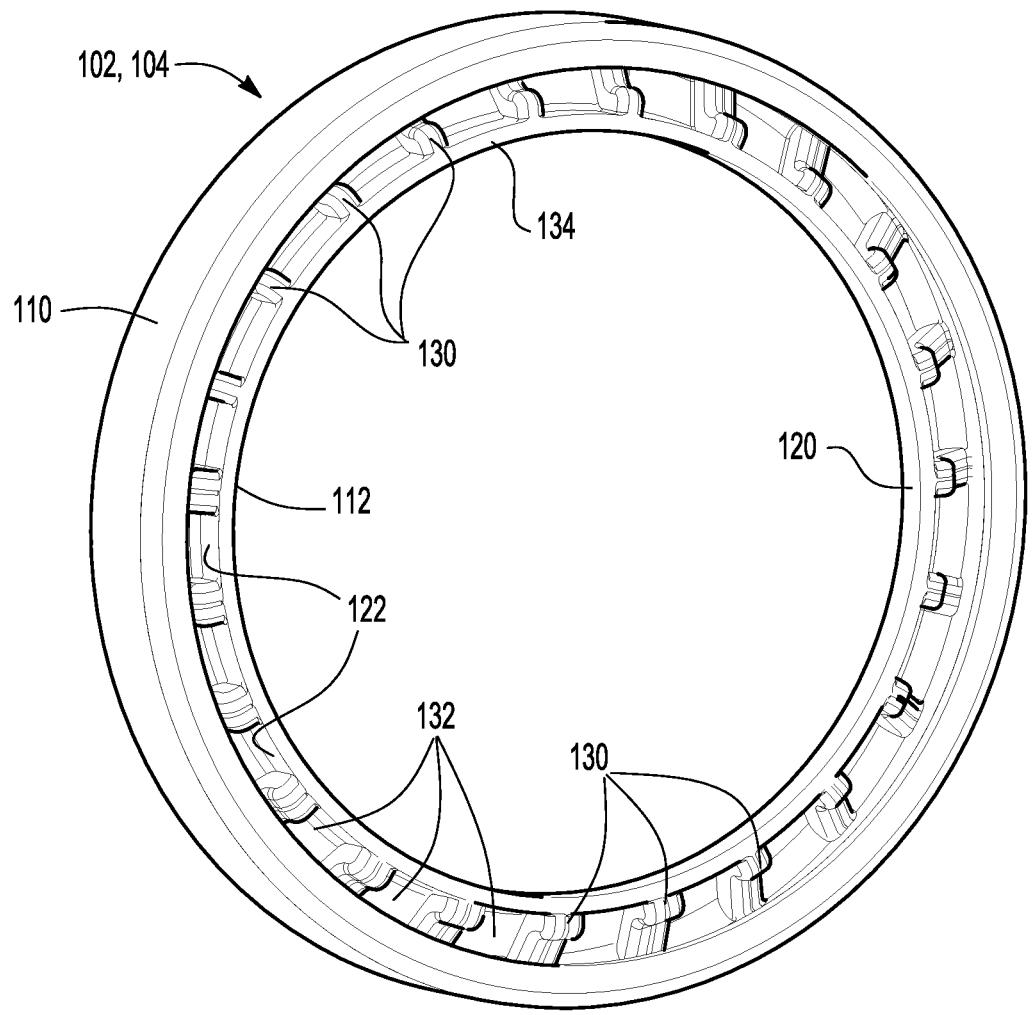
FIG. 3 is a perspective view of a seal that may be provided with a wheel end seal assembly.

The first seal 102 and the second seal 104 may have substantially similar configurations. Referring to FIG. 3, an example of such a seal configuration is shown. In the discussion below, the seal may be referred to as the first seal 102, but it is to be understood that the same attributes may apply to the second seal 104. As such, the term "seal" may refer to the first seal 102 and/or the second seal 104. The first seal 102 may include an annular mounting portion 110 and an annular lip portion 112.

The annular mounting portion 110 may be disposed between the spindle 24 and the hub 50. The annular mounting portion 110 may extend around the axis 30. As such, the annular mounting portion 110 may be configured as a continuous ring that may extend around the spindle 24. In one or more embodiments, the annular mounting portion 110 may be disposed proximate the hub 50.

The annular lip portion 112 may extend from the annular mounting portion 110. The annular lip portion 112 may have a sealing side 120 and a non-sealing side 122.

The sealing side 120 may be configured to sealingly engage the spindle 24 to inhibit the leakage of pressurized gas between the seal and the spindle 24. As such, the sealing side 120 may face away from the annular mounting portion 110 and may extend around and may continuously engage the spindle 24 when the seal is properly installed. At least a portion of the sealing side 120 may face toward the annular mounting portion 110 when the annular lip portion 112 is rolled or when the seal is not properly installed as will be discussed in more detail below. The sealing side 120 may be substantially smooth and may form an inner circumferential surface of the seal.

The non-sealing side 122 may be disposed opposite the sealing side 120. The non-sealing side 122 may face toward the annular mounting portion 110 when the seal is properly installed. At least a portion of the non-sealing side 122 may face away from the annular mounting portion 110 when the annular lip portion 112 is rolled or when the seal is not properly installed as will be discussed in more detail below.

Figure 2A:
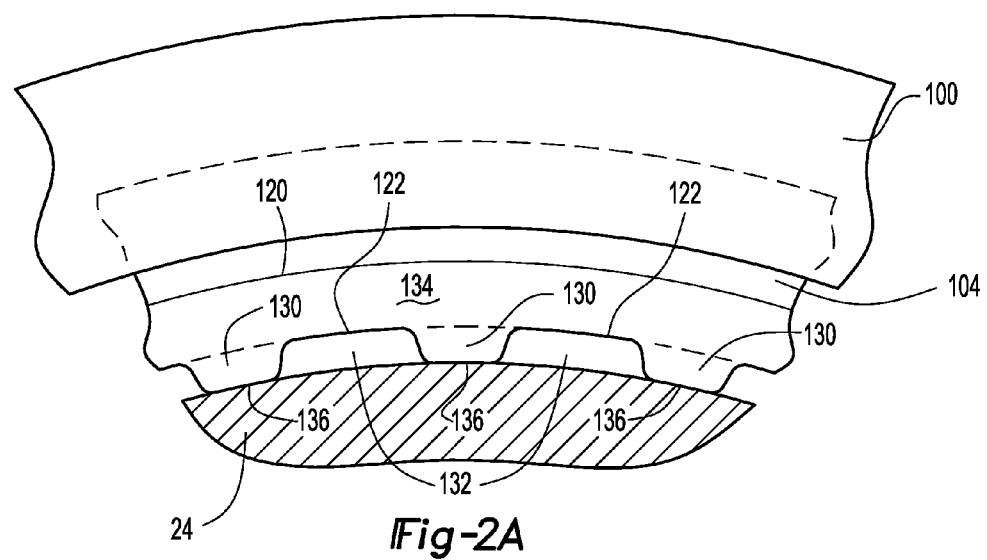
FIG. 2A is a section view of the wheel end seal assembly along section line 2A.

Referring to FIGS. 2 and 2A, the non-sealing side 122 may include a set of protrusions 130. The protrusions 130 may be disposed on the non-sealing side 122 such that the protrusions 130 extend away from the sealing side 120 and toward the annular mounting portion 110. The members of the set of protrusions 130 may be spaced apart from each other. As such, adjacent members of the set of protrusions 130 may cooperate to define a gap 132 that may be disposed between adjacent protrusions 130. In at least one embodiment, the gap 132 may extend from a distal end 134 of the annular lip portion 112 to or toward the annular mounting portion 110. The gap 132 may allow pressurized gas to leak between the seal and the spindle 24 when the annular lip portion 112 is rolled or when the seal is not properly installed such that the leakage may be readily detectable by a pressure test or leak test. Thus, a pressure test or leak test may allow and a rolled or improperly installed seal to be detected and fixed prior to sale or use.

The protrusions 130 may be provided with sufficient length and height to provide gaps 132 that allow a readily detectable amount of pressurized gas to leak through one or more gaps 132 when the annular lip portion 112 is rolled. In the embodiment shown in FIGS. 2-4, the protrusions 130 are configured as ribs that may be radially disposed about the axis 30 and may extend substantially parallel to the axis 30. The protrusions 130 may extend from the distal end 134 of the annular lip portion 112 to or toward the annular mounting portion 110. Each protrusion 130 may include a protrusion tip surface 136 that may be disposed opposite the sealing side 120 of the annular lip portion 112. At least a portion of the protrusion tip surface 136 may face away from the spindle 24 when in sealing side 120 engages the spindle 24. At least a portion of the protrusion tip surface 136 may face toward and may engage the spindle 24 when the annular lip portion 112 is rolled as is best shown in FIG. 2A. In addition, the annular lip portion 112 may include a first annular segment 140 and a second annular segment 142 as is best shown in FIG. 4.

The first annular segment 140 may extend from the annular mounting portion 110 toward the spindle 24. In the embodiment shown, first annular segment 140 may generally extend at an angle from the annular mounting portion 110 to the second annular segment 142 and may be completely spaced apart from the spindle 24. The protrusions 130 may extend along at least a portion of the first annular segment 140 such that the first annular segment 140 may be at least partially spaced apart from the spindle 24 when the annular lip portion 112 is rolled to permit pressurized gas leakage through one or more gaps 132. In addition, the gaps 132 may be wider than the protrusions 130 as is best shown in FIG. 2A to help insure that leakage is readily detectable during a leak test when the annular lip portion 112 is rolled.

The second annular segment 142 may extend from an end of the first annular segment 140 that is disposed opposite the annular mounting portion 110 to the distal end 134. In addition, the second annular segment 142 may be disposed opposite and may be spaced apart from the annular mounting portion 110 when the annular lip portion 112 is not rolled. The sealing side 120 may be completely disposed on the second annular segment 142. As such, the protrusions 130 may extend away from the sealing side 120 and may extend across or along the entire axial length of the second annular segment 142.

Figure 4:
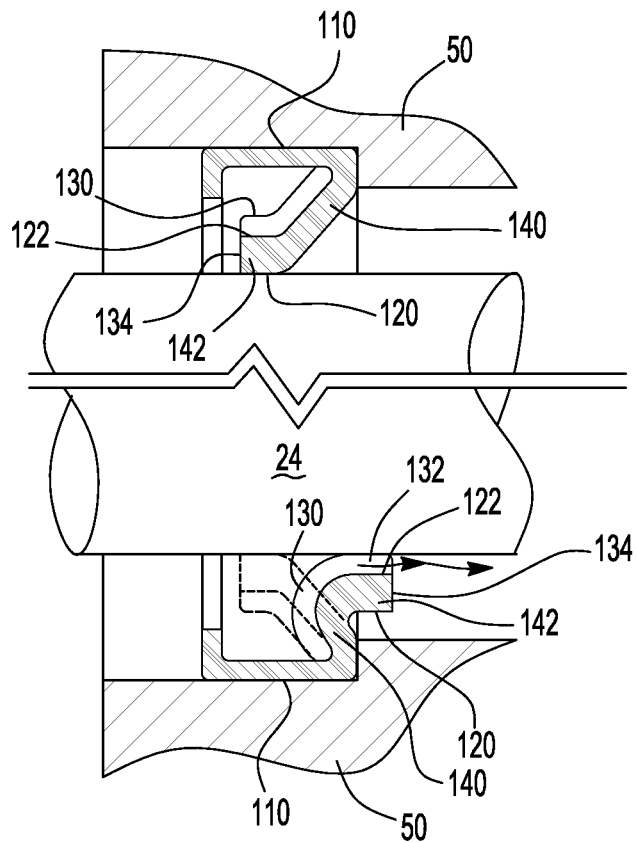
FIG. 4 is a section view of another embodiment of a wheel end seal assembly.

Referring to FIGS. 2, 2A, and 4, proper and improper installation of the seal and rolling of the annular lip portion 112 will now be discussed in more detail. In FIG. 2, the first seal 102 and the second seal 104 are shown in a properly installed position in solid lines. The sealing side 120 of the first seal 102 and the sealing side 120 of the second seal 104 may engage the spindle 24 to inhibit leakage of the pressurized gas. Moreover, the annular lip portion 112 of the first seal 102 and the annular lip portion 112 of the second seal 104 may both extend toward each other and toward the connection passage 108 when the sealing sides 120 face toward the spindle 24.

The first seal 102 and the second seal 104 are also shown in an improperly installed position in phantom in FIG. 2. In addition, the second seal 104 is shown in the improperly installed position in FIG. 2A. More specifically, the phantom lines in FIG. 2 show exemplary rolled positions in which the annular lip portion 112 of the first seal 102 and the annular lip portion 112 of the second seal 104 are at least partially rolled. The annular lip portion 112 of the first seal 102 may not extend toward the connection passage 108 and may extend away from the second seal 104 and its annular lip portion 112 when the annular lip portion 112 of the first seal 102 is rolled. One or more protrusions 130 may engage the spindle 24 when the annular lip portion 112 is rolled. As such, at least a portion of the non-sealing side 122 may face toward the spindle 24 and pressurized gas may pass through one or more gaps 132 between the protrusions 130 and the spindle 24. Accordingly, the protrusions 130 may enable the leakage of pressurized gas through the gaps 132 when the protrusions 130 face toward and/or engage the spindle 24.

Referring to FIG. 4, a seal is shown that is partially rolled. More specifically, a portion of the annular lip portion 112 disposed near the top of FIG. 4 is not rolled while a portion of the annular lip portion 112 disposed proximate the bottom of FIG. 4 is rolled. In addition, FIG. 4 shows an embodiment of a seal that may be provided without a mounting ring. For example, the seal may be received in a recess in the hub 50 and may be positioned such that the annular mounting portion 110 and a portion of the first annular segment 140 may be disposed proximate or may engage the hub 50 while the annular lip portion 112 may engage the spindle 24.

Figure 5:
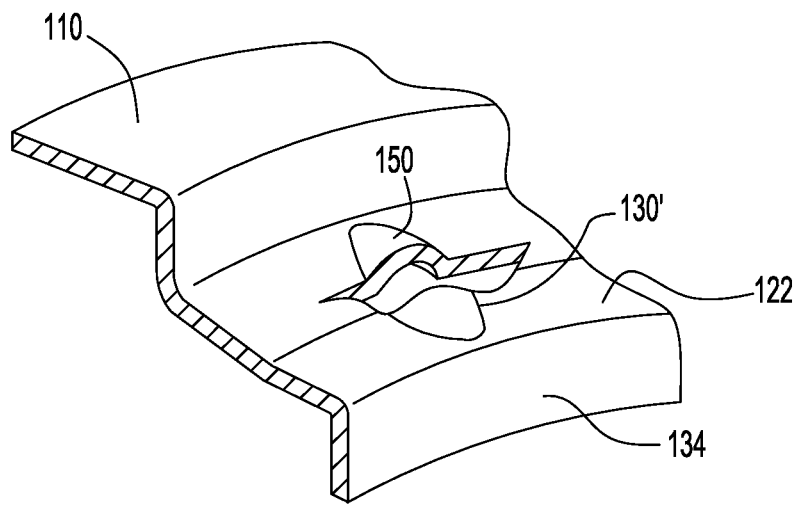
FIG. 5 is a fragmentary perspective view of a portion of another seal that may be provided with a wheel end seal assembly.

Referring to FIG. 5, another embodiment of a seal is shown. This embodiment may be substantially similar to the embodiment shown in FIG. 4 except for the configuration of the protrusions. In FIG. 5, the protrusions 130' are configured as substantially smooth bumps that may have a continuously curved outer surface 150 that may engage the spindle 24 when the annular lip portion 112 is rolled or the seal is not properly installed. In FIG. 5, the protrusion 130' is shown partially fragmented to better illustrate the protrusion curvature, but it is to be understood that the fragmented opening would not be provided with the seal. The protrusions 130 may be disposed proximate and may be spaced apart from the distal end 134 of the annular lip portion 112 in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
   a pressurized gas source that provides a pressurized gas for inflating a tire; and
   a first seal that at least partially defines a connection passage that fluidly connects the pressurized gas source to the tire, wherein the first seal includes:
      an annular mounting portion that extends around an axis; and
      an annular lip portion that extends from the annular mounting portion, wherein the annular lip portion has a sealing side and a non-sealing side disposed opposite the sealing side;
   wherein the first seal inhibits leakage of the pressurized gas when the sealing side faces away from the annular mounting portion and the first seal enables leakage of the pressurized gas when the annular lip portion is rolled such that at least a portion of the sealing side faces toward the annular mounting portion.

2. The tire inflation system of claim 1 wherein the sealing side is substantially smooth.

3. The tire inflation system of claim 1 wherein the sealing side extends around and continuously engages a spindle that rotatably supports a hub that supports the tire to inhibit leakage of the pressurized gas.

4. The tire inflation system of claim 3 wherein the spindle has a spindle passage that is configured as a hole that receives pressurized gas from the pressurized gas source.

5. The tire inflation system of claim 4 wherein the spindle passage is fluidly connected to a hub passage in the hub via the first seal.

6. The tire inflation system of claim 3 wherein the first seal has a set of protrusions that are disposed on the non-sealing side and extend away from the sealing side, wherein members of the set of protrusions are spaced apart from each other such that first and second members of the set of protrusions that are disposed adjacent to each other cooperate to define a gap that is disposed between the first and second members of the set of protrusions.

7. The tire inflation system of claim 6 wherein members of the set of protrusions are configured as substantially smooth bumps that have a continuously curved outer surface that engages the spindle when the annular lip portion is rolled.

8. The tire inflation system of claim 6 wherein at least some of the members of the set of protrusions engage the spindle when the annular lip portion is rolled.

9. The tire inflation system of claim 6 wherein the gap extends from a distal end of the annular lip portion to the annular mounting portion.

10. The tire inflation system of claim 6 wherein the annular mounting portion is disposed between the spindle and the hub.

11. The tire inflation system of claim 6 wherein the annular lip portion includes:
   a first annular segment that extends from the annular mounting portion toward the spindle such that the first annular segment is completely spaced apart from the spindle, and
   a second annular segment that is disposed opposite the annular mounting portion when the annular lip portion is not rolled, wherein the second annular segment extends from an end of the first annular segment to a distal end of the annular lip portion and the sealing side is completely disposed on the second annular segment.

12. A tire inflation system comprising:
   a spindle that at least partially defines a spindle passage for routing a pressurized gas;
   a hub that is disposed proximate the spindle and that at least partially defines a hub passage for routing the pressurized gas;
   a first seal that is disposed between the spindle and the hub and that at least partially defines a connection passage that fluidly connects the spindle passage and the hub passage, wherein the first seal includes:
      an annular mounting portion that extends around the spindle and is disposed proximate the hub; and
      an annular lip portion that extends from the annular mounting portion, wherein the annular lip portion has a sealing side and a non-sealing side disposed opposite the sealing side;
   wherein leakage of pressurized gas between the first seal and the spindle is inhibited when the sealing side engages the spindle and leakage of pressurized gas between the first seal and the spindle is enabled when the annular lip portion is rolled such that at least a portion of the non-sealing side faces toward the spindle.

13. The tire inflation system of claim 12 wherein the hub is rotatably disposed on the spindle.

14. The tire inflation system of claim 12 wherein the hub is configured to rotate about an axis with respect to the spindle and the first seal is disposed on the hub and rotates about the axis with respect to the spindle.

15. The tire inflation system of claim 12 further comprising a second seal that is disposed between the spindle and the hub and that cooperates with the first seal to define the connection passage.

16. The tire inflation system of claim 15 wherein the second seal is spaced apart from the first seal.

17. The tire inflation system of claim 15 wherein the first seal is disposed between the second seal and a distal end of the spindle.

18. The tire inflation system of claim 15 wherein the second seal includes an annular lip portion, wherein the annular lip portion of the first seal and the annular lip portion of the second seal both extend toward the spindle passage when the sealing side of the first seal engages the spindle to inhibit leakage of pressurized gas.

19. The tire inflation system of claim 15 wherein the second seal includes an annular mounting portion that extends around the spindle and is disposed proximate the hub and an annular lip portion that extends from the annular mounting portion, wherein the annular lip portion of the first seal extends toward the annular lip portion of the second seal when the sealing side of the first seal engages the spindle to inhibit leakage of pressurized gas.

20. The tire inflation system of claim 19 wherein the annular lip portion of the first seal does not extend toward the annular lip portion of the second seal when the first seal is rolled.

* * * * *